US007819565B2

(12) United States Patent
Stein

(10) Patent No.: US 7,819,565 B2
(45) **Date of Patent: *Oct. 26, 2010**

(54) MOUNTING FOOT FOR LIGHT BAR

(75) Inventor: Paul L. Stein, O'Fallon, MO (US)

(73) Assignee: Code 3, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/199,433

(22) Filed: Aug. 27, 2008

(65) Prior Publication Data

US 2008/0310178 A1 Dec. 18, 2008

Related U.S. Application Data

(63) Continuation of application No. 11/416,904, filed on May 3, 2006, now Pat. No. 7,419,286.

(51) Int. Cl.
*B60Q 1/00* (2006.01)

(52) U.S. Cl. ........................ 362/493; 362/523; 362/542

(58) Field of Classification Search ................. 362/493, 362/523, 542, 479, 485; 224/329, 327, 321
See application file for complete search history.

(56) References Cited

U.S. PATENT DOCUMENTS

| | | | |
|---|---|---|---|
| 2,643,040 | A | 6/1953 | Hare |
| 3,117,302 | A | 1/1964 | Cardarelli et al. |
| 3,460,728 | A | 8/1969 | Adamson |
| 3,677,451 | A | 7/1972 | Burland |
| 3,779,436 | A | 12/1973 | Burland |
| 3,789,358 | A | 1/1974 | Ellis |
| 4,114,789 | A | 9/1978 | Blaylock et al. |
| 4,269,339 | A | 5/1981 | Bott |
| 4,365,232 | A | 12/1982 | Miller |
| 4,426,028 | A | 1/1984 | Bott |
| 4,588,118 | A | 5/1986 | Ferenc et al. |
| 4,707,014 | A | 11/1987 | Rich |
| 4,867,362 | A | 9/1989 | Finnegan et al. |
| 4,928,216 | A | 5/1990 | Carr |
| 5,097,397 | A | 3/1992 | Stanuch et al. |
| 5,171,083 | A | 12/1992 | Rich |
| 5,481,441 | A | 1/1996 | Stevens |
| 5,826,965 | A | 10/1998 | Lyons |
| 5,884,997 | A | 3/1999 | Stanuch et al. |
| 6,140,918 | A | 10/2000 | Green et al. |
| 6,623,151 | B2 | 9/2003 | Pederson |
| 6,722,776 | B1 | 4/2004 | Lyons et al. |
| 6,845,893 | B2 | 1/2005 | Nelson |
| 6,863,424 | B2 | 3/2005 | Smith |
| 6,951,409 | B2 * | 10/2005 | Hsien ......................... 362/191 |

(Continued)

FOREIGN PATENT DOCUMENTS

EP 0483511 A2 5/1992

*Primary Examiner*—Gunyoung T Lee
(74) *Attorney, Agent, or Firm*—Senniger Powers LLP

(57) ABSTRACT

A mounting foot for mounting a light bar on a roof of a vehicle includes at least one platform. The platform includes a recess for slidably receiving a base of a light assembly to mount the light assembly on the platform. The light assembly has a base fixedly secured to the platform and a light enclosure rotatably connected to the base of the light assembly.

18 Claims, 19 Drawing Sheets

U.S. PATENT DOCUMENTS

| | | | |
|---|---|---|---|
| 7,244,053 | B2 | 7/2007 | Bader et al. |
| 7,258,555 | B2 | 8/2007 | Tiesler et al. |
| 2004/0227370 | A1 | 11/2004 | Bader et al. |
| 2004/0252021 | A1 | 12/2004 | Frank et al. |
| 2005/0002199 | A1 | 1/2005 | Stuffle et al. |

* cited by examiner 18A
32
90
20
14
23
34
10
22
12

18B 16
58
54
52
48
46
68
70
72
74
78
50
L
56

16
56
72
74
68
70
58
54
46
48

42
42
42
36
14
90
70
68
72
48
74
78
82
46
56
16
58

12
48
83
86
88
94
60
94
95
62
92
90
14
32
50
46
56
54
16

10
90
G
28
18A
29
92
G
94
24A
90
14
88
W1
89C
QC
89
26A
26
25
24B
24
27
RT
RT
89B
12
W1
88
14
W2
W2
18B
18B
QC
QC 102
16
10
L
14
90
32
100
18A
32
90
16
14
L
$D_1$ 106
18B
104
108
18B
12
24
14
106
20
108
107
18A
14

MOUNTING FOOT FOR LIGHT BAR

CROSS-REFERENCE TO RELATED APPLICATIONS

This application is a continuation of U.S. patent application Ser. No. 11/416,904, filed May 3, 2006, the disclosure of which is herein incorporated by reference.

BACKGROUND OF INVENTION

The present invention relates generally to a mounting foot for a light bar.

Emergency vehicles, such as police cars, ambulances, security vehicles, often have a light bar mounted on the roof for signaling to pedestrians and other motorists. One way to mount the light bar on the roof is the use of spaced apart mounting feet disposed on lateral sides of the vehicle. The mounting feet are secured to the roof of the vehicle and the light bar is mounted on the mounting feet.

SUMMARY OF INVENTION

In one aspect, a mounting foot for mounting a light bar on a roof of a vehicle comprises a body having an outer longitudinal end, opposite sides, and a top surface. During use, the outer longitudinal end of the base is generally adjacent a lateral edge of the roof. At least one platform is adjacent the outer longitudinal end of the body. The platform has an upper surface below the top surface of the body. The platform comprises a recess for slidably receiving a base of a light assembly to mount the light assembly on the platform.

In another aspect, a mounting foot for mounting a light bar on a roof of a vehicle comprises a base having an outer end, opposite sides, and a generally planar top surface. At least one platform is adjacent the outer end of the base. The platform has a generally planar upper surface generally parallel to and below the top surface of the base. A light assembly has a base removably secured to the platform and a light enclosure rotatably connected to the base of the light assembly.

In yet another aspect, a mounting foot for mounting a light bar on a roof of a vehicle comprises a body having an outer longitudinal end, opposite sides, and a top surface. When the light bar is mounted on the roof of the vehicle using the mounting foot, the outer longitudinal end of the base is generally adjacent a lateral edge of the roof. At least one platform is adjacent the outer end of the body. The at least one platform has an upper surface below the top surface of the body. A connecting plate has a light bar connecting portion for securement to a light bar to mount the light bar on the mounting foot. The connecting plate also has a bracket connecting portion for securement to a mounting bracket to mount the mounting foot on the roof of the vehicle.

In a further aspect, a light assembly for a platform of a mounting foot comprises a base adapted to be slidably received on a platform of the mounting foot. A light enclosure houses a light rotatably mounted on the base.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
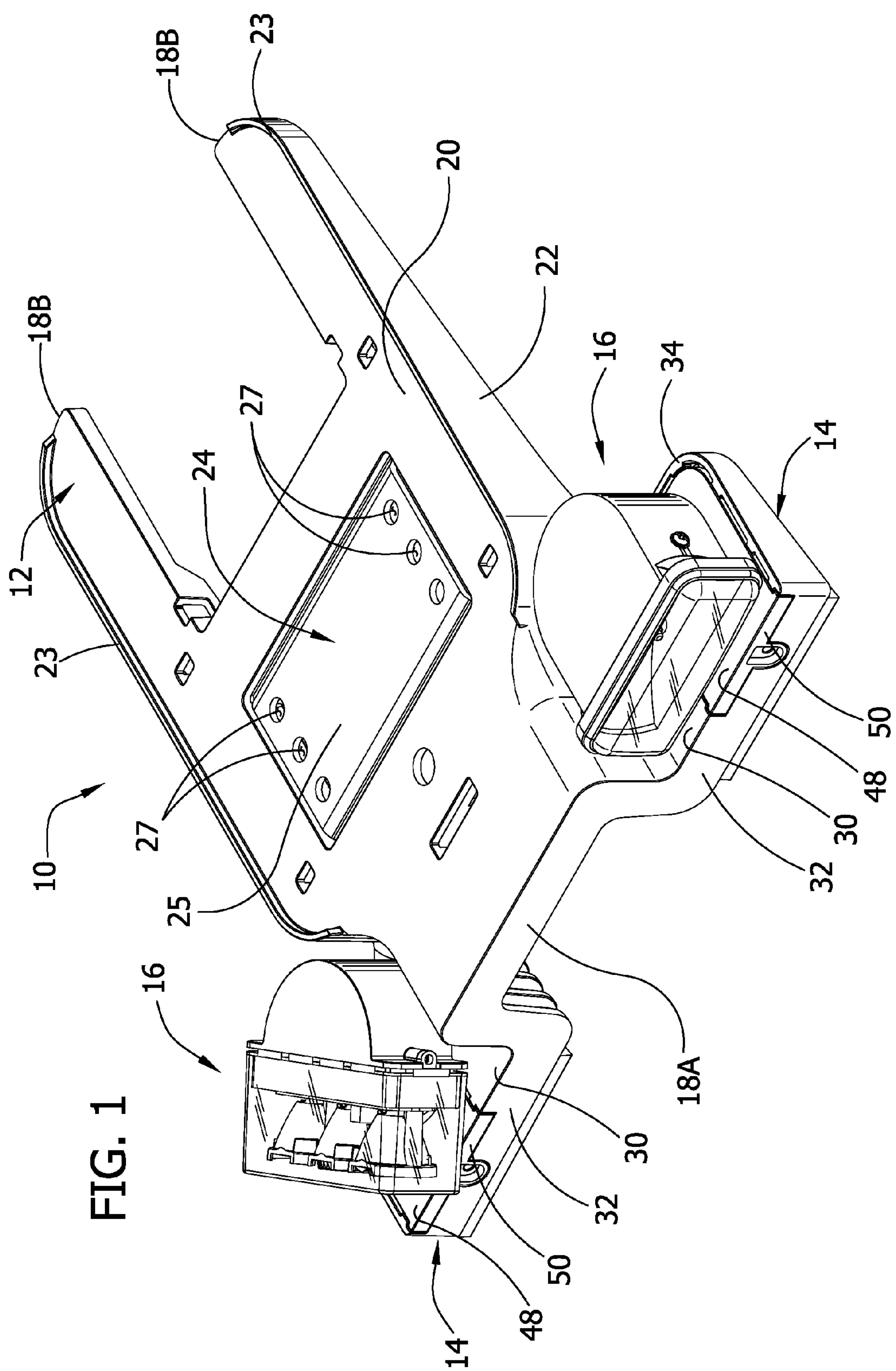
FIG. 1 is a perspective of a mounting foot for a light bar including light assemblies mounted on platforms of the mounting foot.

Referring now to the drawings, a mounting foot for mounting a light bar on a vehicle is generally indicated at 10. The mounting foot includes a body, generally indicated at 12, and a pair of platforms, generally indicated at 14, extending laterally from the body. An optional light assembly, generally indicated at 16, is mounted on each of the platforms 14.

Figure 2:
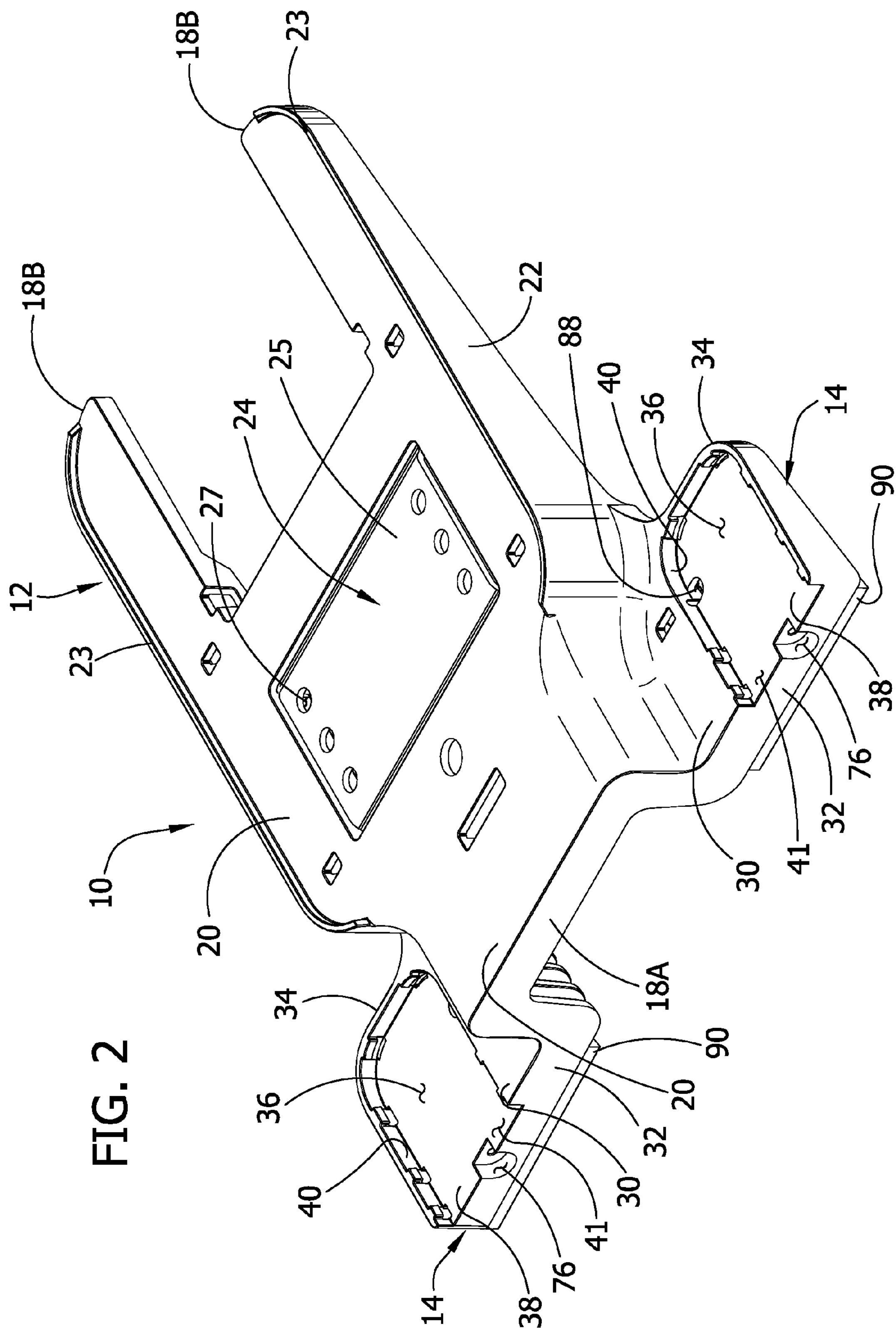
FIG. 2 is a perspective of the mounting foot of FIG. 1 with the light assemblies removed.
Figure 3:
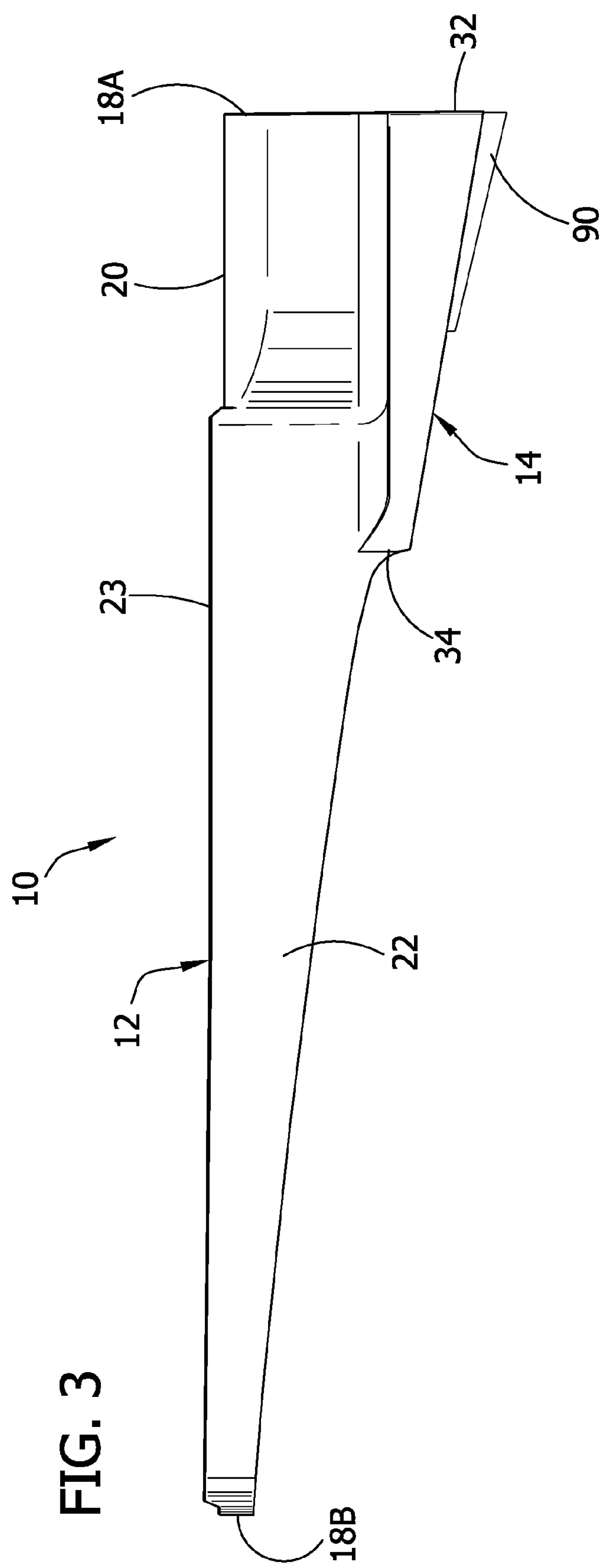
FIG. 3 is a rear elevational view of the mounting foot of FIG. 2.
Figure 4:
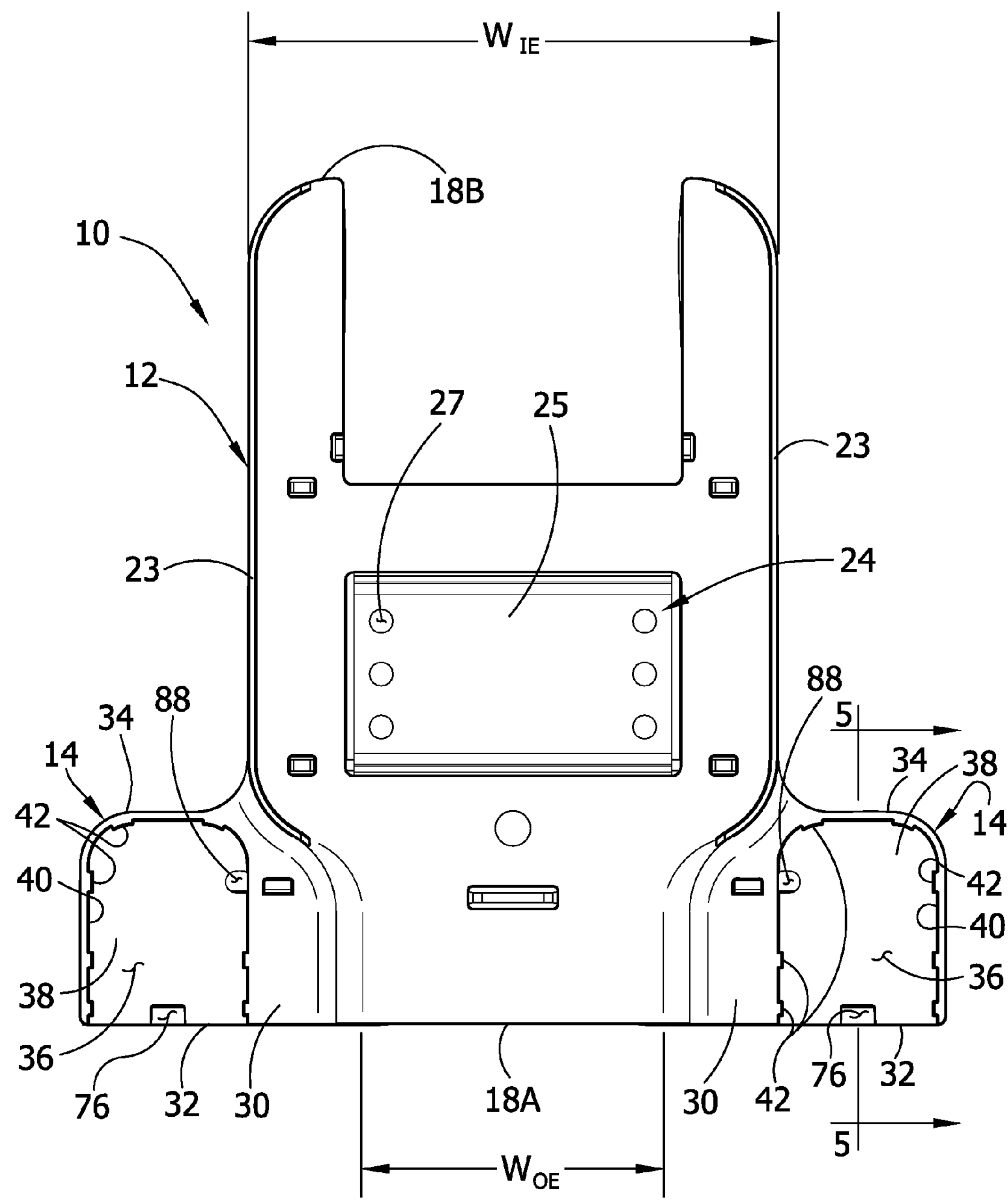
FIG. 4 is a top plan view of the mounting foot of FIG. 2.
Figure 12:
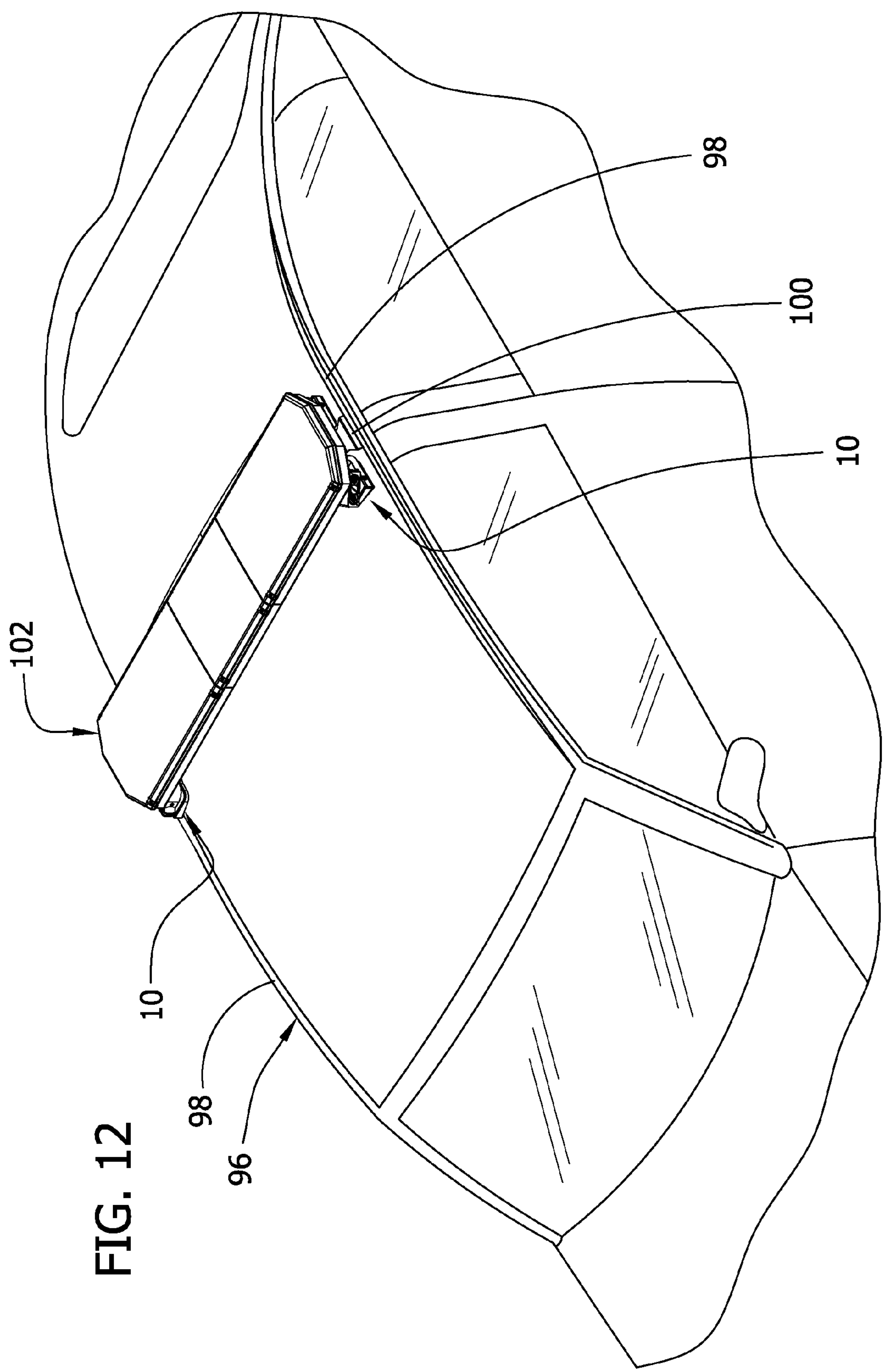
FIG. 12 is a perspective of the light bar mounting on the mounting foot which is mounted on the roof of the vehicle.
Figure 13:
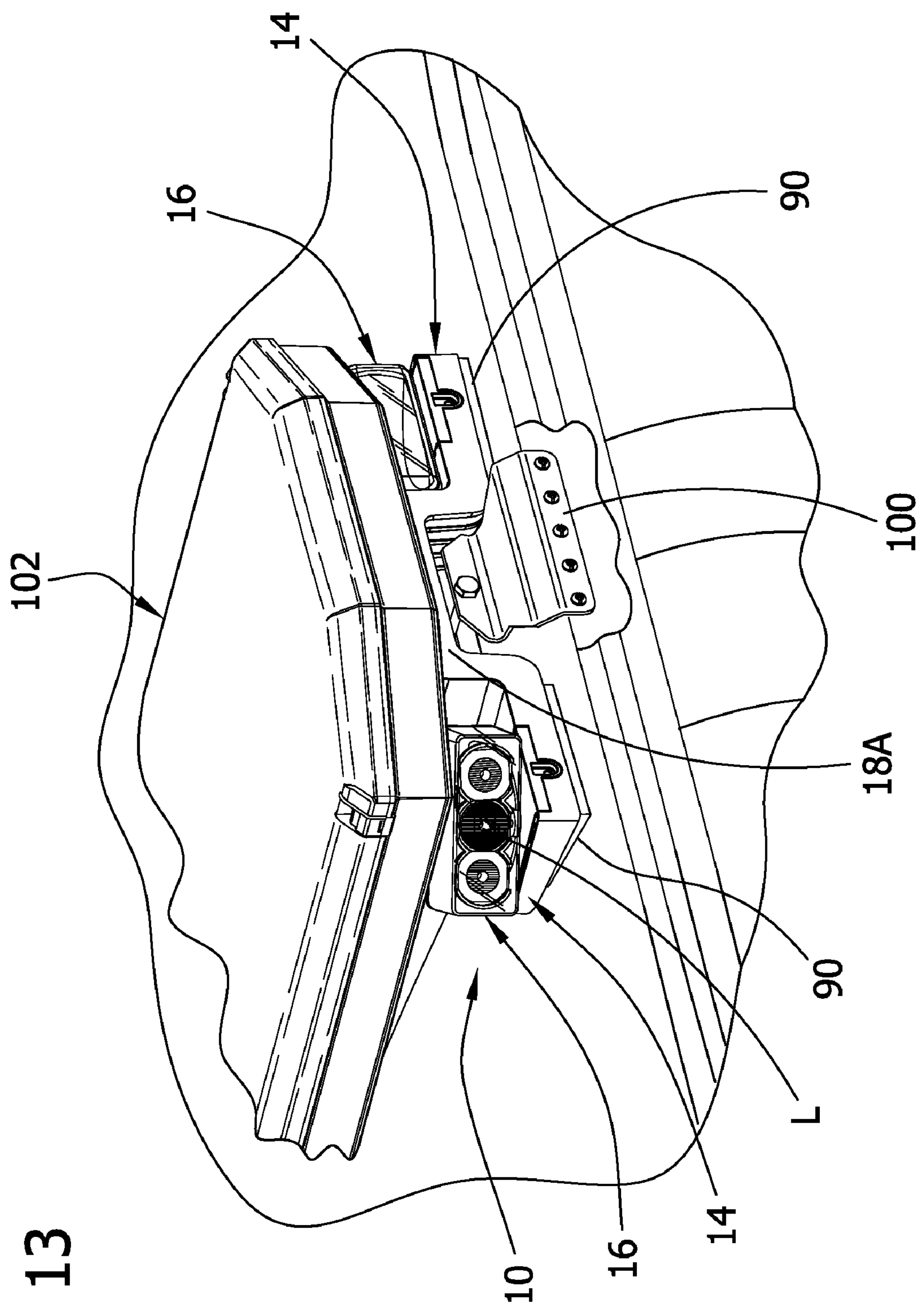
FIG. 13 is an enlarged partial perspective of a light bar mounted on the mounting foot which is mounted on a roof of a vehicle.
Figure 14:
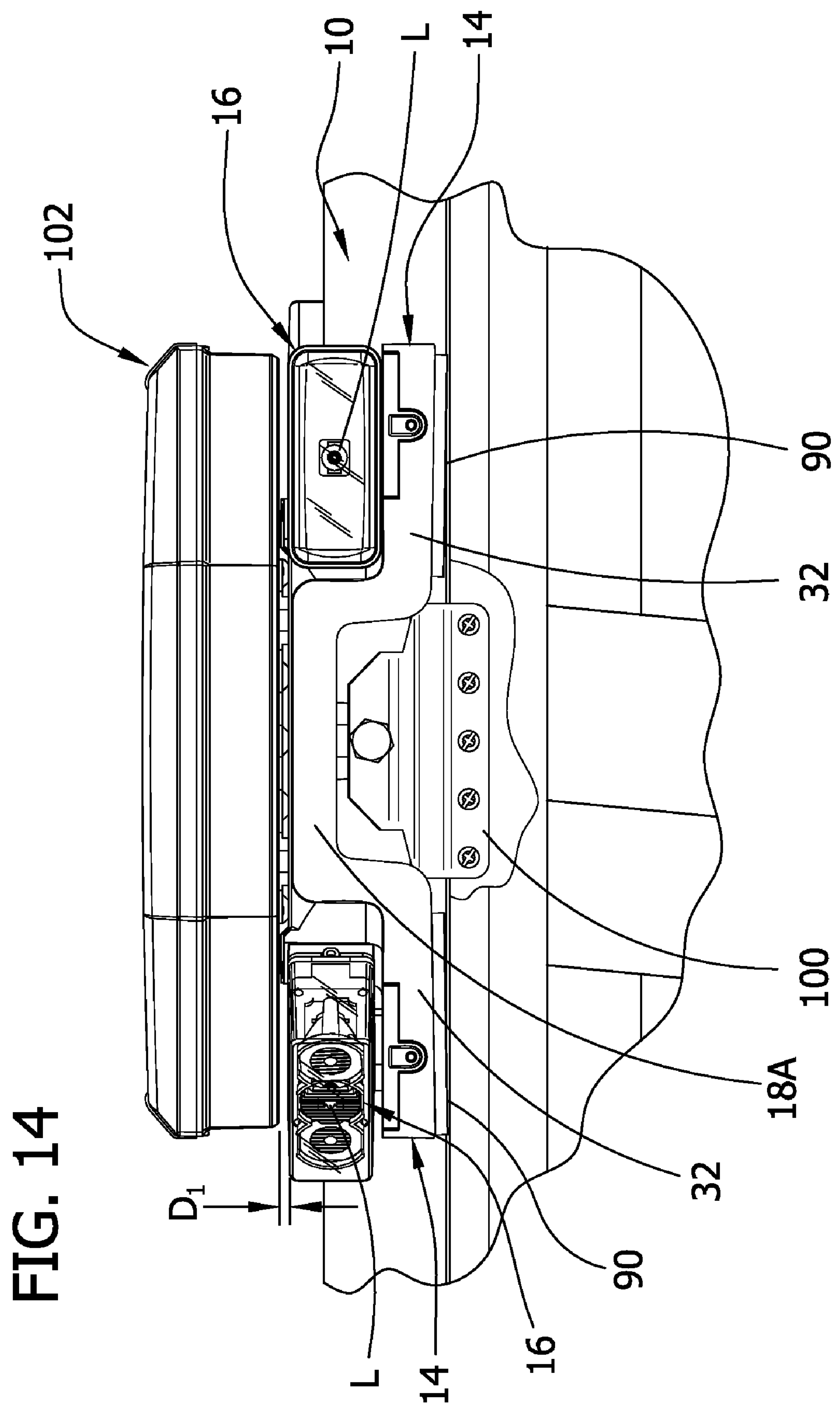
FIG. 14 is a front elevational view of the light bar, mounting foot and roof of FIG. 12.

Referring to FIGS. 1-4, the body 12 of the mounting foot 10 has an outer longitudinal end 18A and corresponding end margin, which are disposed adjacent a lateral edge of a roof of a vehicle when the foot 10 is in use (see, for example, FIGS. 13 and 14). An inner longitudinal end margin 18B and corresponding end margin are spaced from the lateral edge of the roof when the foot 10 is in use. A top surface 20 of the body 12 is generally planar for supporting a light bar 102 (FIGS. 12-14). Referring to FIG. 4, a width $W_{OE}$ of the top surface 20 at the outer end margin is less than the width $W_{IE}$ of the top surface at the inner end margin such that the top surface narrows from the inner end 18B to the outer end 18A. Opposite lateral side walls 22 (only one of which is shown in FIGS. 1-3) extend downward from the top surface 20 of the body 12. As shown best in FIG. 3, the side walls 22 are beveled from the outer end margin toward the inner end margin to profile the lateral slope of the vehicle's roof. Opposite rails 23 extend upward from the top surface 20 of the body 12 at the side walls 22. The rails 23 contact a bottom surface of the light bar 102 when the light bar is mounted on the foot 10. The rails 23 have a height of about ⅛ in. The body 12 of the mounting foot 10 may be constructed of plastic or other suitable material and may be formed by injection molding, for example.

Figure 11:
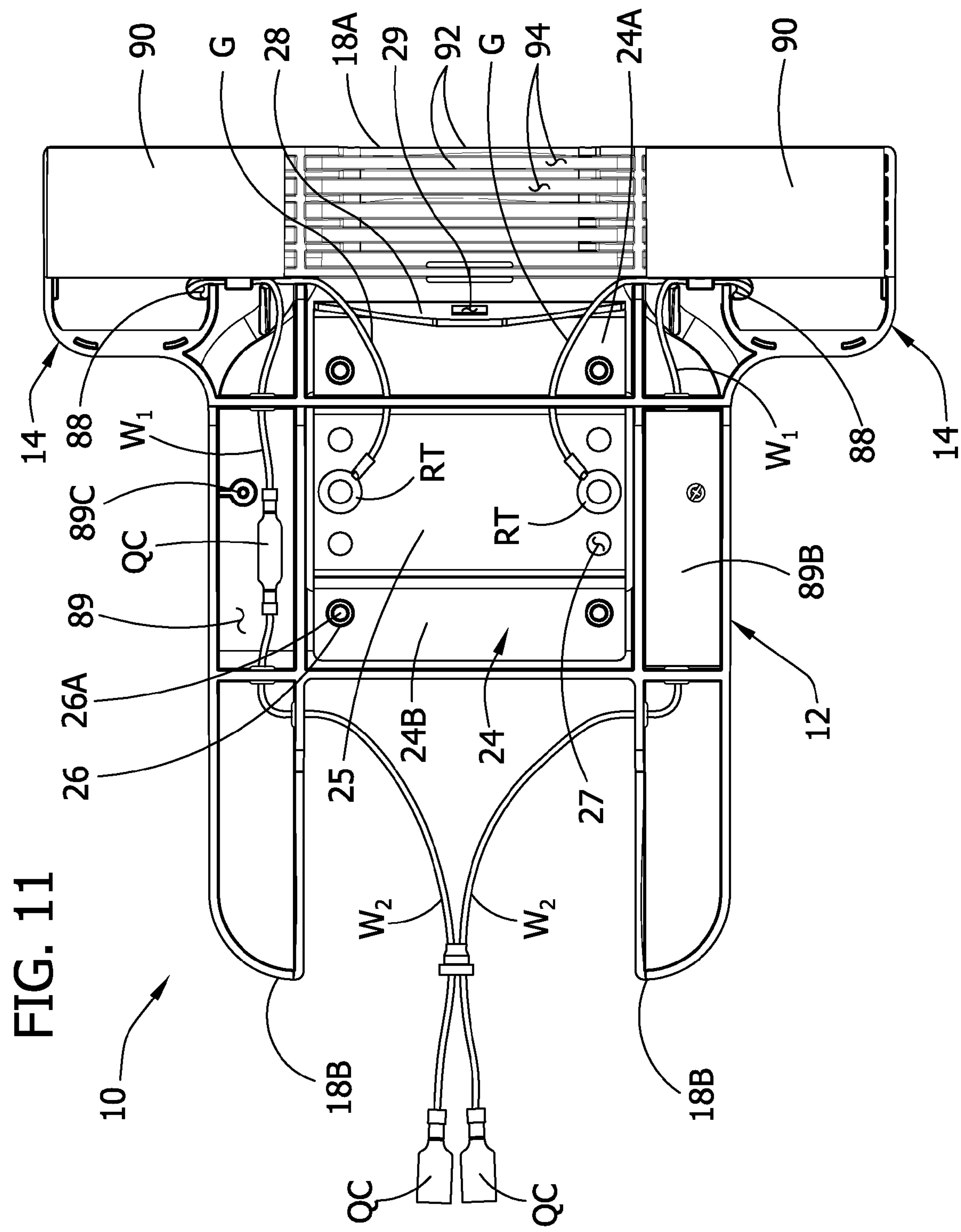
FIG. 11 is a bottom plan view of the mounting foot of FIG. 2.

Referring to FIGS. 1, 2, 4 and 11, a metal connecting plate, generally indicated at 24, is secured to a bottom surface of the body 12 (FIG. 11). The connecting plate 24 has opposite outer and inner end margins 24A, 24B (FIG. 11), respectively, and a light bar connecting portion 25 disposed between the end margins. The connecting plate 24 is bent or otherwise formed such that the connecting portion 25 is substantially parallel to and elevated above the end margins 24A, 24B. The end margins 24A, 24B include locating openings 26 for receiving locating pegs 26A extending downward from the bottom of the foot 10 (FIG. 11). When the locating pegs 26A are received in the locating openings 26, the light bar connecting portion 25 extends through a rectangular opening generally in the center of the body 12 so that the light bar connecting portion 25 is substantially flush with the top surface 20 of the body. The light bar connecting portion 25 is generally rectangular with lateral aligned fastener openings 27 for receiving a carriage bolt or other fastener (not shown) extending from the light bar 102 to secure the light bar to the mounting foot 10. The connecting plate 24 also includes a bracket connecting portion 28 (FIG. 11) at the outer end margin 24A of the plate disposed below the body 12. The bracket connecting portion 28 includes a fastener opening 29 for receiving a suitable fastener (e.g., a bolt and nut) for securing the mounting foot 10 to a metal mounting bracket 100 (FIGS. 12-14) to mount the foot 10 on the vehicle's roof. Thus, when assembled, the light bar 102 is directly secured to the metal connecting plate 25, which is secured to the vehicle via the mounting bracket 100, and the mounting foot 10 is sandwiched between the light bar and the connecting plate. In this way, the components holding the light bar 102 on the vehicle (i.e., the light bar connecting plate 25, and the mounting bracket 100) are all constructed of strong, rigid metal, such as steel, to ensure the light bar is adequately secured to vehicle.

Referring to FIGS. 2-5, the platforms 14 of the mounting foot 10 project laterally from lower portions of the side walls 22 at the outer end margin of the body 12. The platforms 14 are essentially mirror images, and therefore, for convenience, only one of the platforms will be referred to in the following description. The platform 14 is disposed horizontally below the top surface 20 of the body 12. An upper surface 30 of the platform 14 is generally planar and generally parallel to the top surface 20 of the body 12. The platform 14 has an outer longitudinal end 32 contiguous with the outer end 18A of the body 12 of the mounting foot 10, and an opposite inner end 34.

Figure 5:
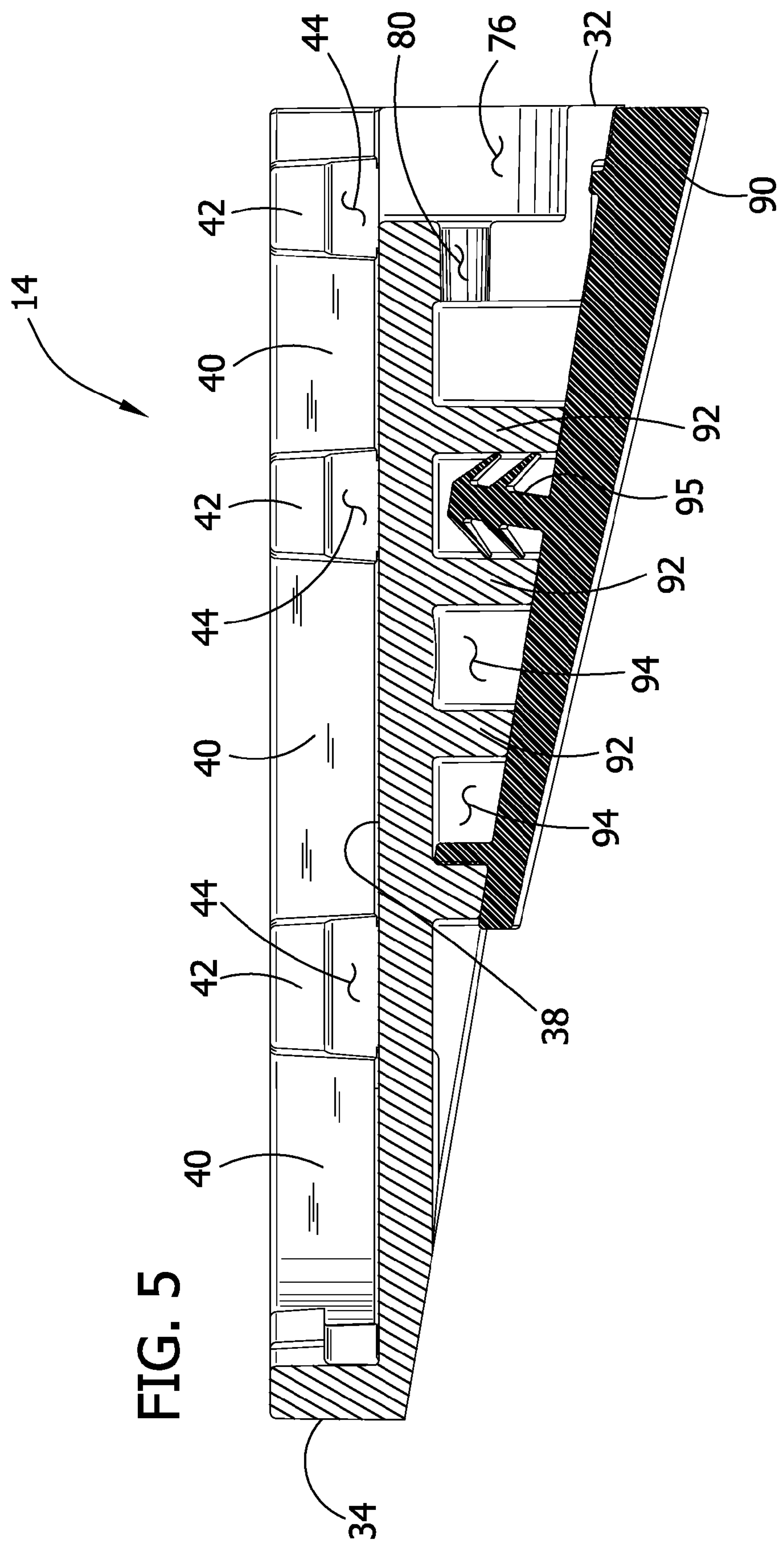
FIG. 5 is a section of a platform of the mounting foot taken in the plane defined by the line 5-5 in FIG. 4.

Referring to FIGS. 2-6, a recess 36 for receiving a base plate 46 of the optional light assembly 16 is formed in the upper surface 30 of the platform 14. Alternatively, the recess 36 and the base plate 46 may be an integral, unitary structure with the platform 14. Moreover, the light assembly need not be received in the recess 36; for example, a plate, similar to the base plate 46, not associated with a light assembly may be positioned within the recess 36. The recess 36 is defined by a generally planar bottom surface 38 and a U-shaped wall 40 running along the perimeter of the bottom surface. The U-shaped wall 40 defines an entry 41 (FIG. 2) at the outer end 32 of the platform 14 for receiving the light assembly 16. For purposes discussed below, spaced apart ledges 42 project inward from the wall 40 around the perimeter of the recess 36. The ledges 42 are vertically and generally uniformly spaced from the bottom surface 38 defining the recess 36 to define a pluralities of grooves 44 (shown best in FIG. 5), which together define a track running longitudinally along the U-shaped wall 40 adjacent the bottom surface (FIGS. 2 and 5). It is understood that alternatively, the platform may comprise a single, continuous ledge, instead a plurality of ledges, to define the track or groove.

Figure 6:
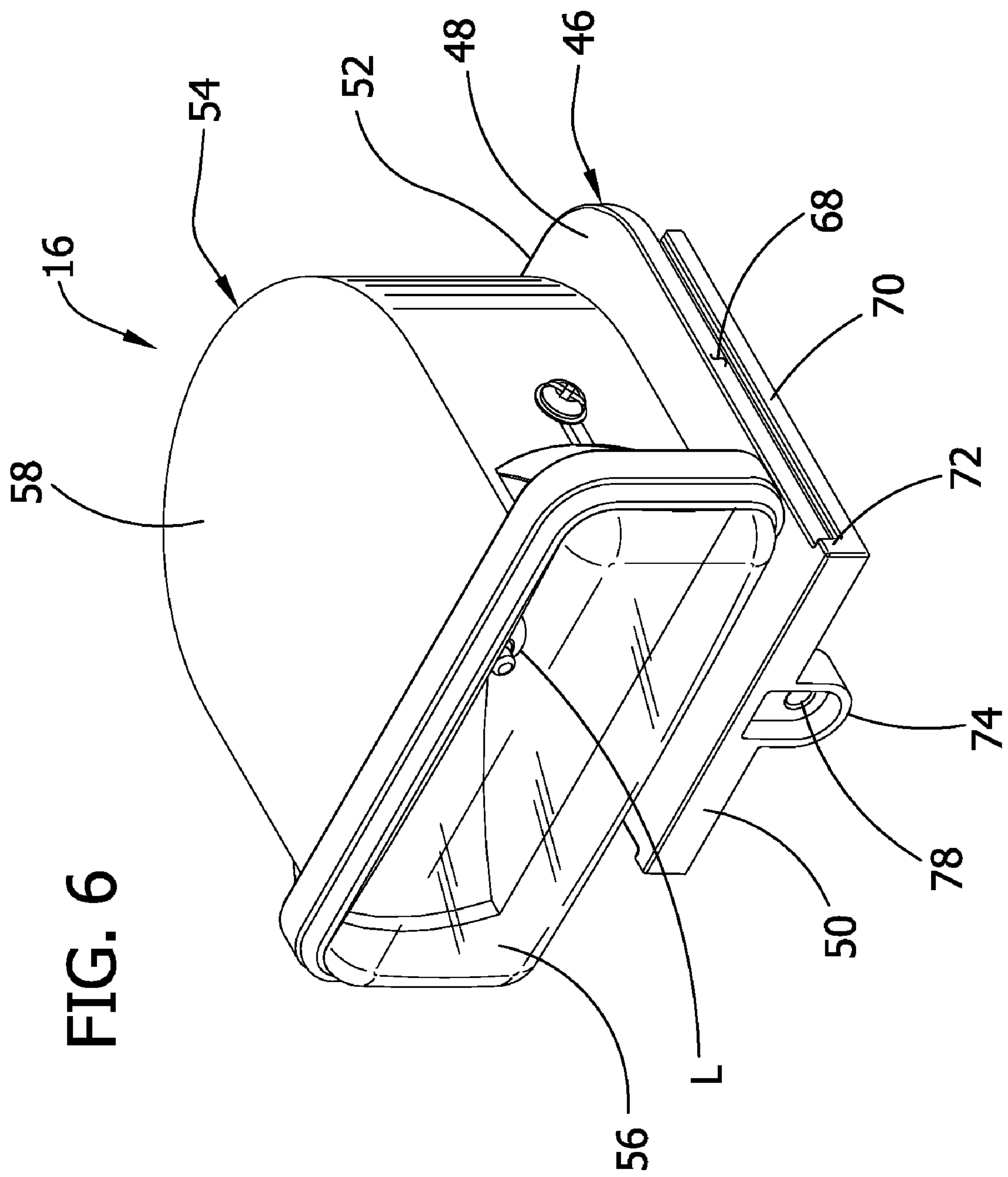
FIG. 6 is a perspective of a light assembly for the mounting foot.
Figure 7:
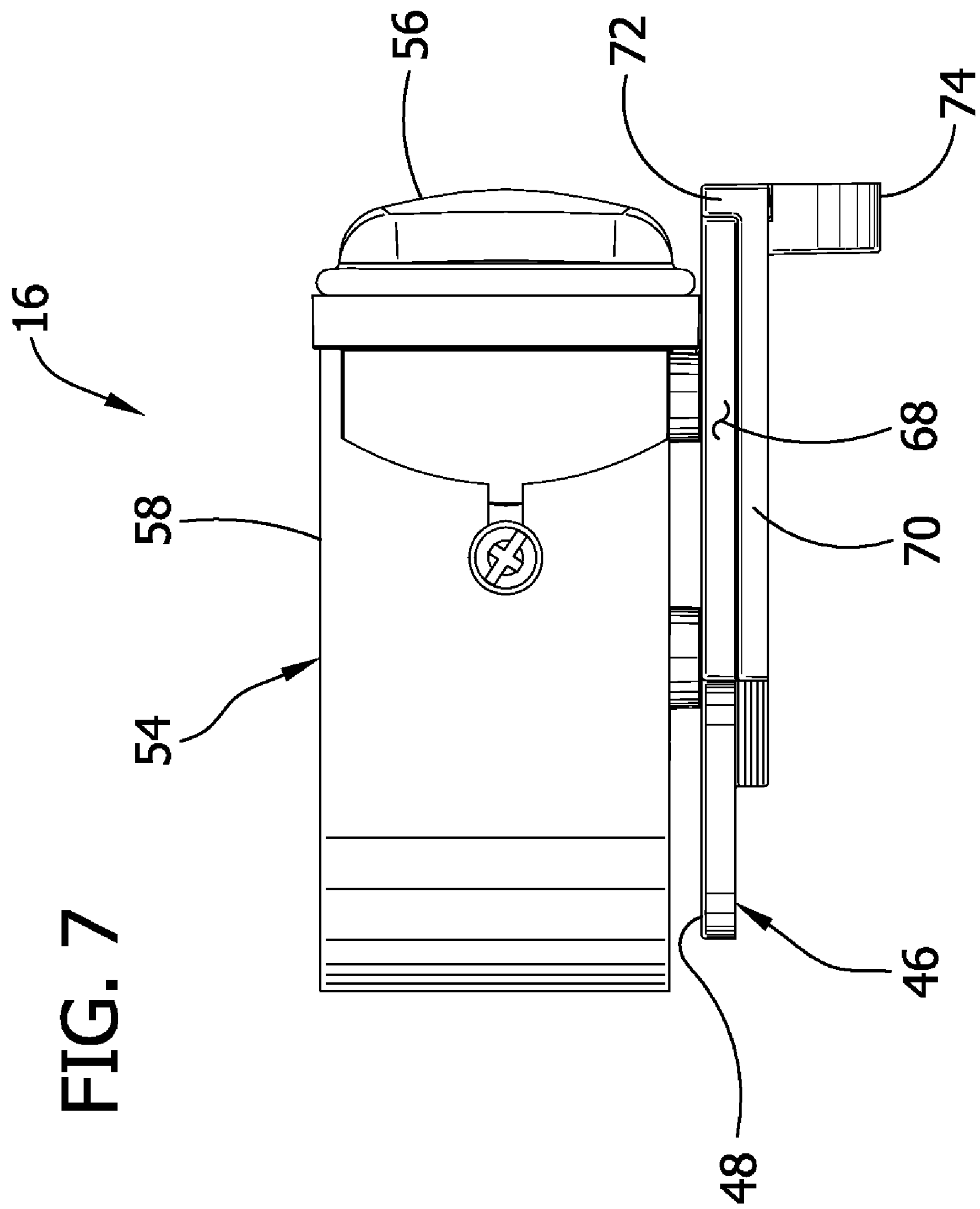
FIG. 7 is a rear elevational view of the light assembly of FIG. 6.
Figure 8:
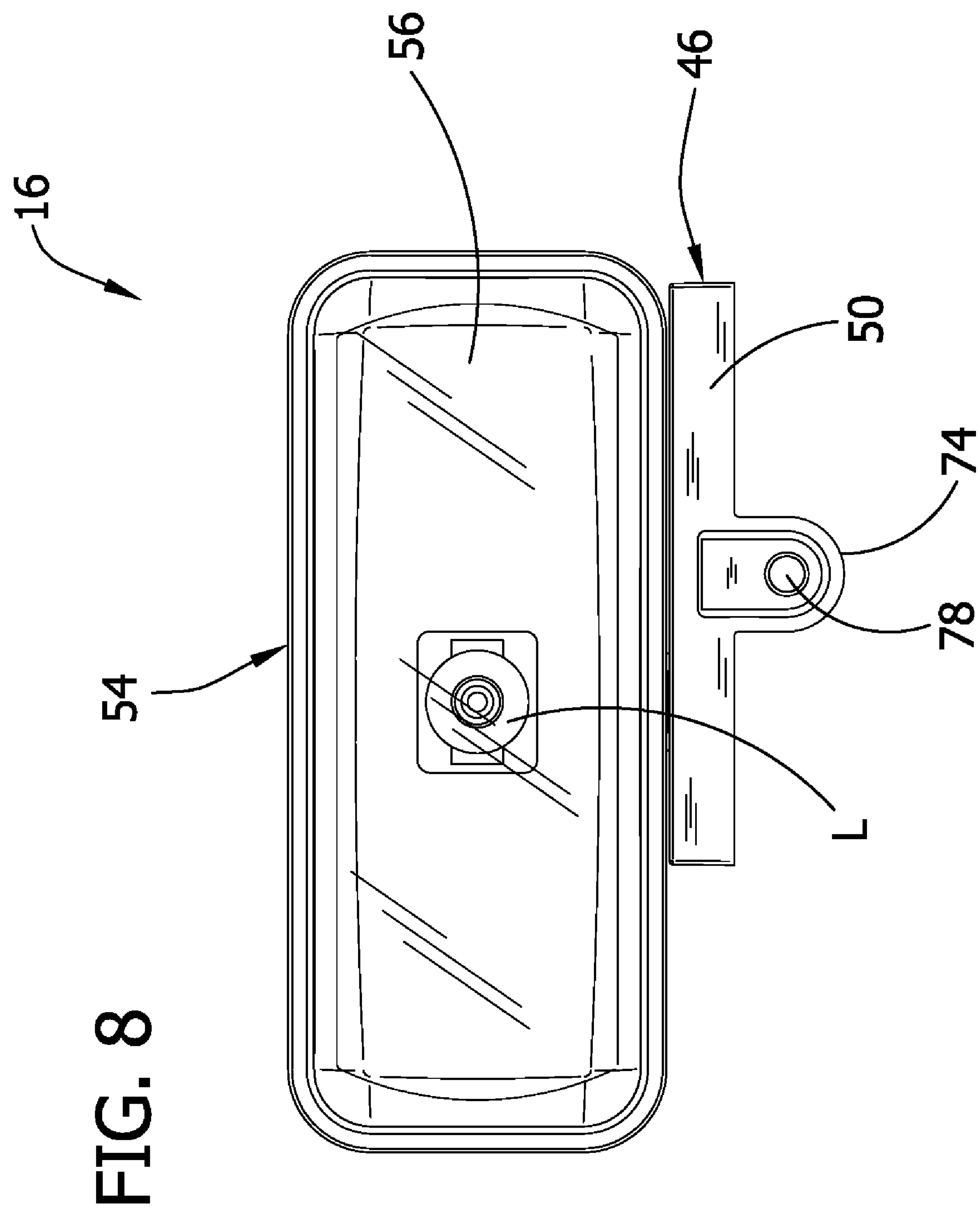
FIG. 8 is a left elevational view of the light assembly of FIG. 6.

Referring to FIGS. 6-8, the light assembly 16 comprises a base plate, generally indicated at 46, for being slidably received in the recess 36 of the platform 14 to mount the light assembly on the platform. The base 46 has a generally planar upper surface 48 and a U-shaped periphery with an outer end 50 and an arcuate inner end 52. A light enclosure 54, including a light source L housed within the light enclosure, is rotatably mounted on the upper surface 48 of the base 46. The light enclosure 16 has a generally U-shaped periphery having a light cover 56 at a front end, an arcuate rear end and a generally planar top surface 58. The light sources L of the illustrated embodiments comprise either a single halogen lamp or three LEDs, although it is contemplated that the source may have other arrangements.

Figure 8A:
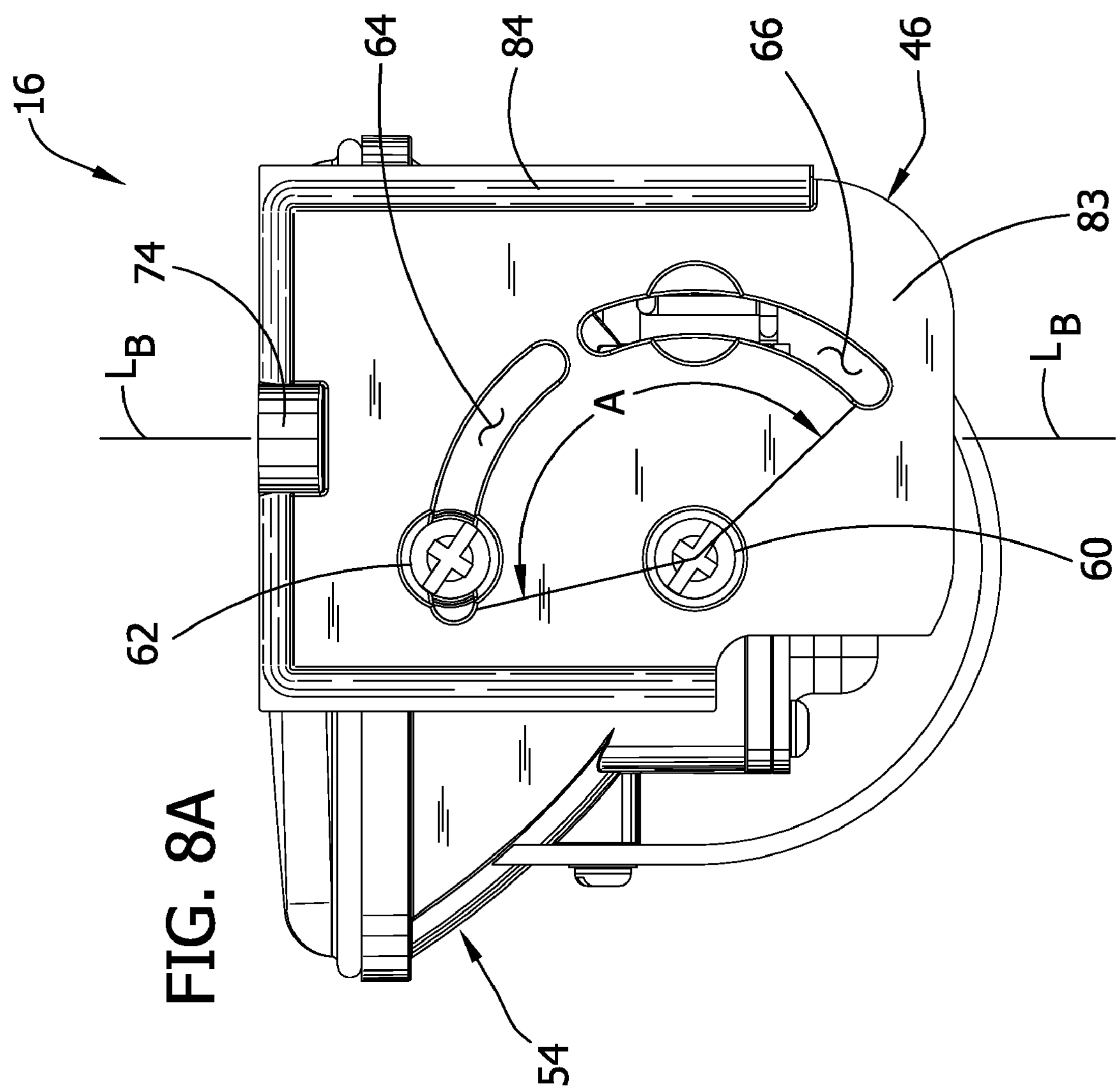
FIG. 8A is a bottom plan view of the light assembly of FIG. 6.
Figure 10:
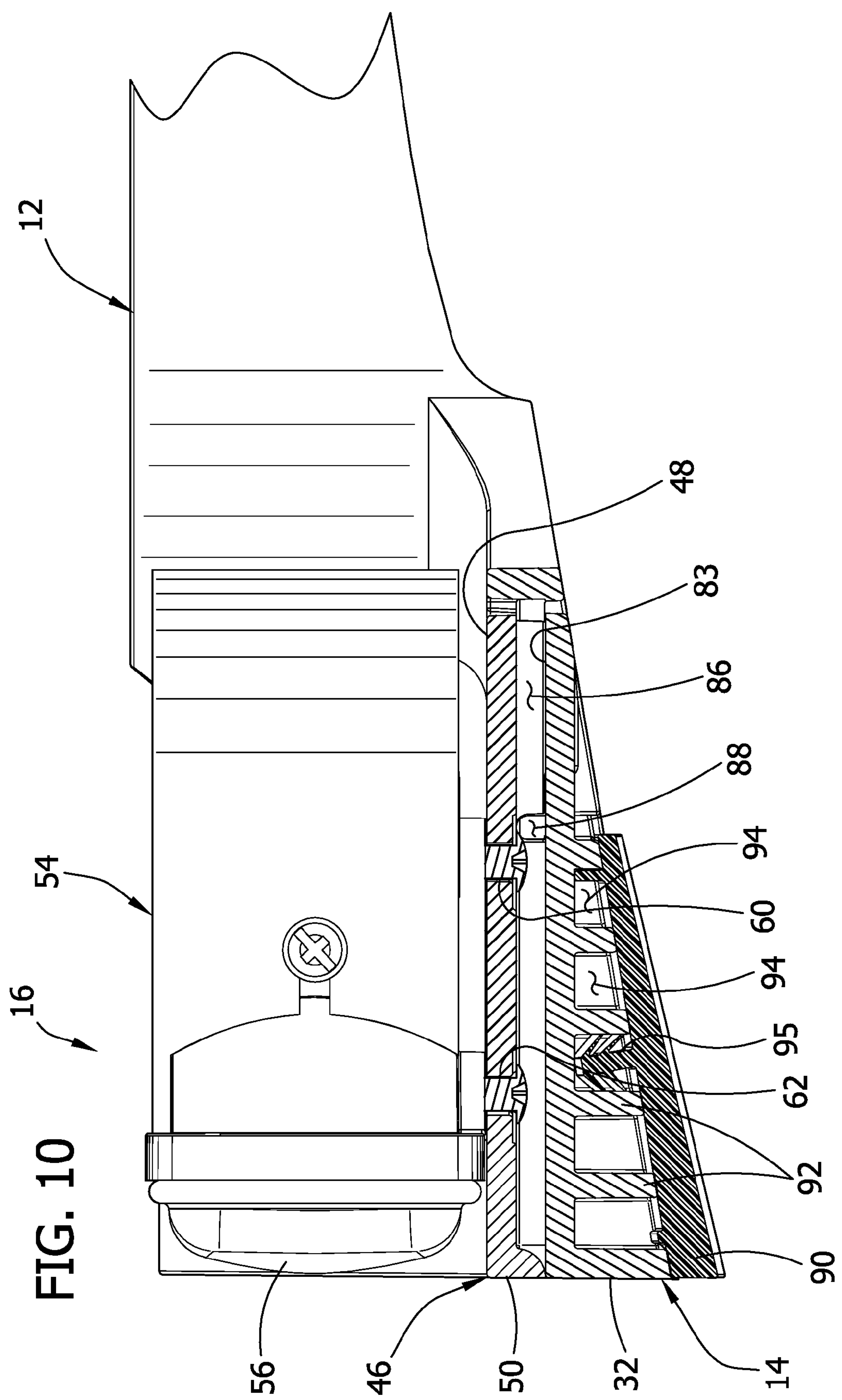
FIG. 10 is a partial longitudinal section of a base of the light assembly received in the recess of the mounting foot.

Referring to FIGS. 8A and 10, an axial shaft 60 rotatably connects the light enclosure 54, including the light source L, to the base 46 to allow the light enclosure and the light source to rotate about the base. As illustrated in FIG. 8A, the axial shaft 60 is laterally offset from a longitudinal axis $L_B$ of the base 46, thereby offsetting the light enclosure with respect to the base. In this way, the light enclosure 54 and the light source L are centered with respect to the platform 14, not the recess 36, when the light assembly 16 is mounted on the platform. The axial shaft 60 is secured within a through hole in the base 46 and is rotatable within the hole about its longitudinal axis, which defines a rotational axis of the light enclosure. For example, the axial shaft 60 may be a bolt that is threaded into the light enclosure 54 but not threaded into the opening of the base 46. The axial shaft 60 may be secured to the base 46 in other ways that allow the axial shaft to freely rotate about the base. Alternatively, the light enclosure 54 may be rotatable about the shaft 60, and the shaft may be fixed to the base 46.

Referring still to FIGS. 7, 8A and 10, the light enclosure 54 also includes a threaded locking fastener 62 extending through either a first curvilinear slot 64 or a second curvilinear slot 66 formed in the base 46 and threaded into the light enclosure 54. Together the first and second slots 64, 66, respectively, define a path of rotation of the light enclosure 54. It is understood that the path of rotation may be defined by a single slot. It is believe, however, that using one elongate slot instead of the combination of two (or more) separate slots 64, 66 to define the path of rotation may compromise the structural integrity of the base 46. The locking fastener 62 is adapted to be configurable between a locked position, in which it is fixed within the slot 64, and an unlocked position, in which it is able to slide within the slots 64, 66 as the light enclosure 54 is rotated about its rotational axis. Thus, to configure the fastener 62 into the locked position, the fastener is threaded further into the light enclosure 54 such that a head of the fastener is clamped against the base 46. Moreover, to switch slots 64, 66, the locking fastener 62 is removed from the respective slot to allow the light enclosure 54 to be rotated to a position above the other slot where the fastener can be threaded back into the light enclosure.

The locking fastener 62 allows a user to selectively fix a radial position of the light enclosure 54 relative to the base 46 to prevent rotation of the light enclosure. The light enclosure 54 may be rotatable from a first radial position to a second radial position along the curvilinear slots 64, 66. The maximum degree of rotation A defined by ends of the curvilinear slots 64, 66 may be between about 45 degrees and 150 degrees and more specifically about 120 degrees. Other ways of fixedly securing the radial position of the light enclosure relative to the base and preventing the light enclosure from rotating with respect to the base are within the scope of this invention.

Figure 9:
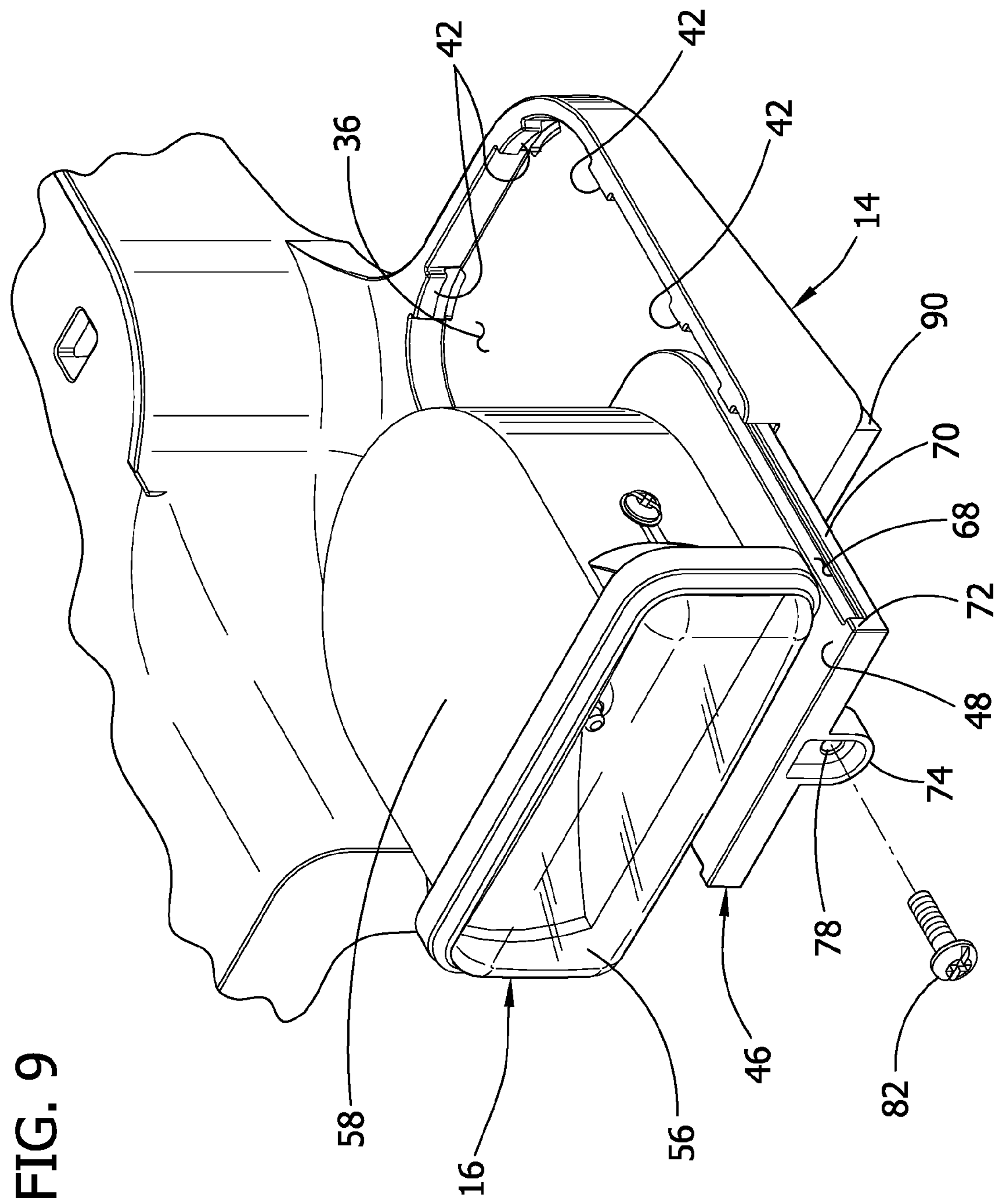
FIG. 9 is an enlarged perspective of the light assembly being received in a recess of one of the platforms of the mounting foot.

Referring to FIGS. 6, 7 and 9, longitudinal notches 68 formed in the sides of the base 46 extend adjacent the outer end 50 of the base toward the inner end 52 of the base to define tongues 70 extending laterally from lower portions of the base. The notches 68 do not extend through the outer end 50 of the base 46 to define stop members 72 at the outer end. The tongues 70 are sized and shaped to be slidably received in the track defined by the grooves 44 of the recess 36. Thus, to insert the base 46 into the recess 36 of the platform 14, the inner end 52 of the base is aligned with the entry 41 at the outer end 32 of the platform. The base 46 is slid into the recess 36 such that the tongues 70 of the base slide within the track of the recess until the stop members 72 at the outer end 50 of the base contact corresponding ledges 42 adjacent the outer end 32 of the platform 14. At this time, the base 46 is fully received in the recess 36 (as shown in FIG. 1) and the outer end 50 of the base is substantially flush with the outer end 32 of the platform 14 to make a substantially planar-looking surface. Moreover, the upper surface 48 of the base 46 is substantially flush with the upper surface 30 of the platform 14 (FIG. 1) to make a substantially planar-looking surface.

Referring to FIGS. 6-9, an arcuate tab 74 extends downward from the base 46 at the outer end 50. The tab 74 is sized and shaped to be received in an arcuate recess 76 (FIGS. 2, 4 and 5) formed in the outer end 32 of the platform 14 when the base 46 is fully received in the recess. The tab 74 has a fastener opening 78 extending therethrough (FIGS. 8 and 9), and the platform 14 has a similar fastener opening 80 (FIG. 5) in contiguous relationship with the arcuate recess 76. The fastener openings 78, 80 are aligned when the tab 74 is received in the arcuate recess 78. A suitable fastener 82, such as a bolt (FIG. 9), may be inserted through the aligned openings to fixedly secure the base to the platform. Other ways of securing the base 46 within the recess 36 of the platform 14 are within the scope of this invention.

Referring to FIGS. 8A and 10, a central portion of a bottom surface 83 of the base 46 is recessed to define a foundational wall 84 (FIG. 8A) adjacent the outer end 32 and the opposite sides of the base. When the base 46 is received in the recess 36 of the platform 14 (FIG. 10), the foundational wall 84 contacts the bottom surface 38 defining the recess 36 and the bottom surface 83 of the base is spaced from the bottom surface of the recess to define a chamber 86. The side of the base 46 adjacent the body 12 of the mounting foot 10 is notched to allow wires extending from the light enclosure 54 to enter the chamber 86. The chamber 86 allows for the wires to be hidden underneath the base 46. A wire opening 88 (FIGS. 2, 4 and 10) extends through the bottom surface 38 and the U-shaped wall 40 adjacent the body 12 of the mounting foot 10 to receive the wires. The foundational wall 84 adjacent the body 12 of the mounting foot 10 extends longitudinally to the wire opening 88 but does not extend past or otherwise cover the wire opening. As shown in FIG. 11, the wires $W_1$ run from the chamber 86 through the wire opening 88 to outside the chamber. The wires $W_1$ run to second chambers 89 which are defined by respective sides 22 of the mounting foot 10, ribs 89A extending downward from the foot and removable plates 89B (only one plate is illustrated in FIG. 11 for illustrative purposes). The plates 89B are secured to mounting foot using fasteners, such as screws, threaded into fastener openings 89C of the mounting foot. Each wire $W_1$ is connected to a second wire $W_2$ within the second chamber 89 by a quick connect attachment QC. The second wires $W_2$ are connected to a power source (not shown) within the light bar.

Ground wires G also run out of the wire openings 88. The ground wires G run to connecting plate 24 where they can be attached (i.e., grounded) to the carriage bolts extending from the light bar 102 using a ring-type terminal RT, for example. This arrangement allows for the wires to be hidden within the chamber 86 to not only protect the wires from environmental elements such as rain and dirt, but also to provide an aesthetically pleasing look to the mounting foot.

As can be appreciated, appropriate dimensions of the base 46, the recess 36, the grooves 44, the tongues 70 and the foundational wall 84 are interdependent to ensure that the base is snugly received in the recess, the chamber 86 is large enough for the wires, and the appropriate surfaces of the base are flush with the corresponding surfaces of the platform 14. Other necessary interdependent dimensions may also be necessary to provide a well-functioning and an aesthetically pleasing mounting foot 10.

The platform 14 is beveled at its lower surface (FIG. 3) so that it has a slope substantially the same as the slope of the side walls 22 of the body 12 of the mounting foot 10 to correspond to the slope of the vehicle's roof. Referring particularly to FIGS. 5, 10 and 11, a frictional member 90 secured to the lower surface of the platform 14 prohibits movement of the mounting foot 10 on the vehicle's roof. Fins 92 extend downward from the lower surface of the platform 14 to define a plurality of channels 94. The frictional member 90 includes a press-fit connector 95 adapted to be secured within one of the channels 94 defined by adjacent fins 92 to secure the frictional member to the platform 14. Other ways of securing the frictional member 90 to the platform are within the scope of this invention. For example, the frictional member 90 may be molded onto the platform 14. The frictional member 90 may be constructed of a rubber or other material suitable for both imparting frictional forces on the vehicle's roof and not scratching or otherwise damaging the roof. Other ways of preventing movement of the mounting foot 10 on the vehicle's roof are within the scope of this invention.

Referring to FIG. 12-14, in use, a pair of mounting feet 10 are placed on a vehicle's roof 98 such that each outer end 32 of the feet are adjacent a corresponding lateral edge 98 of the roof and the feet are substantially laterally aligned. The feet 10 are secured to the roof 98 using mounting brackets 100 secured to the vehicle, such as under the rain gutter, and the bracket connecting portions 28 of the connecting plates 24. A suitable fastener may be inserted through fastener holes of the mounting brackets and into the fastener holes 29 of the connecting plates 24. Other ways of securing the mounting feet 10 to the vehicle's roof are within the scope of this invention.

The light enclosures 54 and associated light sources L are selectively positioned in selected radial positions with respect to the bases 46 before being mounted on the platforms 14. The locking fasteners 62 are loosened into their unlocked positions and the light enclosures 54, including the light sources L, are rotated about their rotational axes to their selected positions. The locking fasteners 62 are then tightened into their locked position to fix the selected positions of the light enclosures 54. The bases 46 of the light assemblies 16 are slid into the recesses 36 of the platforms 14 via the entries 41 so that the bases of the light assemblies are partially received in the recesses. The wires running from the light enclosures 54 are inserted through the wire openings 88 in the bottom surfaces 38 defining the recesses 36, at which time the bases 46 are slid further into the recesses so that they are completely received therein. The bases 46 are fixedly secured in the recesses 36 by inserting the fasteners 82 into the aligned fastener openings 78, 80 of the arcuate tabs and the arcuate openings, respectively.

Once the light assemblies 16 are mounted on the platforms 14, a light bar 102 is mounted on the mounting feet 10 using appropriate fasteners and the bar connecting portion 25 of the connecting plate 24. When the light bar 102 is mounted on the feet 10, the bottom surface of the light bar is spaced a vertical distance $D_1$ from the planar top surfaces 58 of the light enclosures 54. The vertical distance is small, such as about ⅛ in to give the entire assembly an integral look. A spacer (not shown) may be disposed on the top surface 20 (e.g., on the light bar connecting portion 25 of the connecting plate 24) to space the light bar a greater distance from the light assemblies 16. For example, a spacer having a width of about ⅛ in would provide a total vertical distance between the light bar 102 and the light assemblies 16 of about ¼ in. Also, one or more of the light assemblies 16 may be removed while the light bar 102 is secured to the mounting feet 10 by unfastening the appropriate fastener 82 and sliding the corresponding base 46 out of the recess 36. For example, one or more of the light assemblies 16 may be removed to adjust the radial position of the light enclosure 54 and light source L or may be removed to replace the light assembly with a different type of light or no light.

As can be seen, mounting the light assemblies 16 on the platforms 14 at an elevation below the elevation of the light bar 102 provides multi-level signaling. This multi-level signaling allows the light assemblies 16 to be used as alley lights or takedown lights, for example, without negatively affecting the visual performance of the light bar 102. Moreover, because the light assemblies 16 are slidably received horizontally within the platforms 14, the light assemblies can be easily replaced without having to remove the light bar 102 from the mounting foot 10.

It is understood that the order of the steps of the process may be different than disclosed. For example, the light bar 102 may be mounted before the light assemblies 16 are mounted on the platforms 14.

Figure 15:
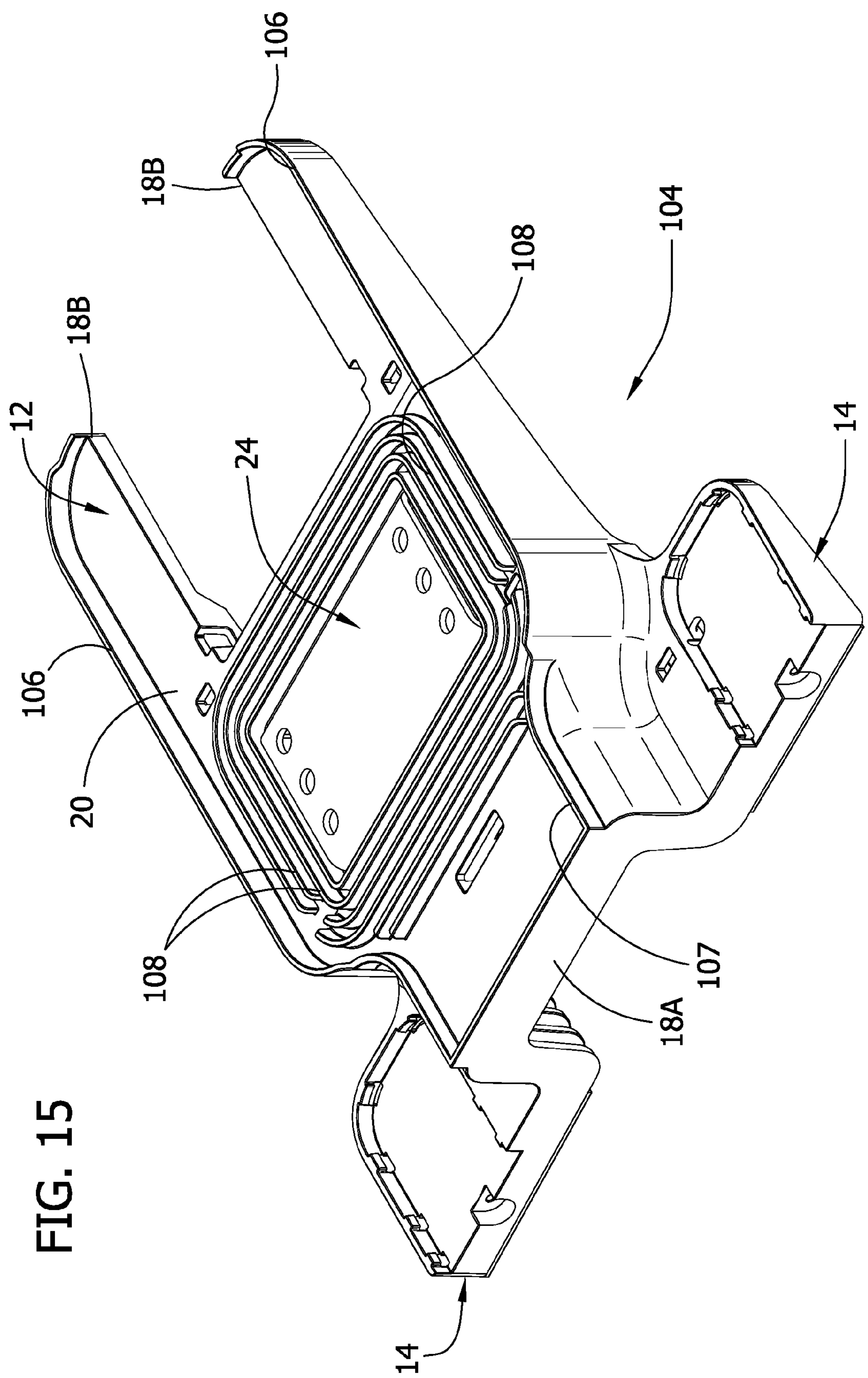
FIG. 15 is a perspective of another embodiment of a mounting foot.
Figure 16:
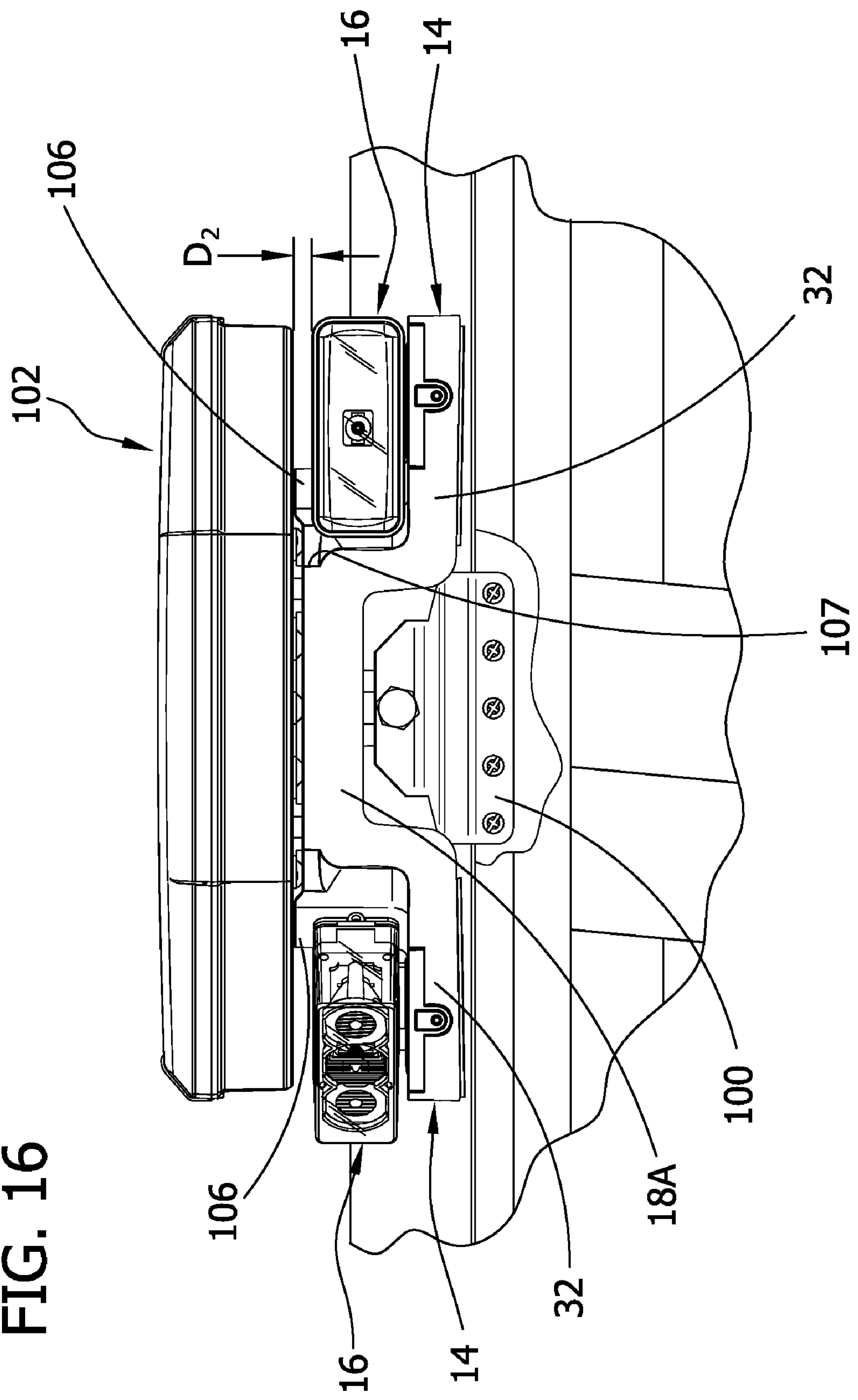
FIG. 16 is a front elevational view of a light bar mounted on a roof of a vehicle using the mounting foot or FIG. 15.

Referring to FIGS. 15 and 16, another embodiment of the mounting foot is generally indicated at 104. This mounting foot 104 is similar to the mounting foot 10 of the previous embodiment, and therefore corresponding parts and components will be identified by corresponding reference numerals. The difference between the mounting foot 104 and the previous mounting foot 10 is that the present mounting foot spaces the light bar 102 a greater vertical distance $D_2$ (FIG. 16) from the light assemblies 16 when the light bar is mounted on the foot. The greater vertical distance $D_2$ ensures that the light bar 102 is spaced an adequate distance from the light assemblies 16 so that the heat emitting from the light assemblies does not melt or otherwise adversely affect the integrity of the mounting foot, especially when the mounting foot is constructed of a plastic material.

To create this greater vertical distance $D_2$, first rails 106 have a height of about ⅜ in, which is about ¼ in greater than the corresponding rails 23 of the previous embodiment. Moreover, a second rail 107 extends upward from the outer longitudinal end 18A of the mounting foot 104 and connects ends of the first rails 106, and projections 108 extend upward from the top surface 20 of the mounting foot 10 and surround the central rectangular opening. The second rail 107 and the projections 108 have height of about ¼ in. Accordingly, when the light bar 102 is mounted on the mounting foot 104, the bottom surface of the light bar rests on the first rails 106, the second rail 107 and the projections 108 to space the light bar a vertical distance $D_2$ of about ⅜ in (FIG. 16).

Alternatively, the mounting foot 10 may include a separate spacer member (not shown) that is sized and shaped to rest on the top surface 20 of the body 12 to increase the vertical distance $D_1$ between the light assemblies 16 and the light bar 102. For example, the spacer member may have a height (or thickness) of about ⅛ in. In addition, the spacer member may include openings adapted for alignment with the fastener openings 26 in the bar connecting portion 25 of the connecting plate 24 for receiving the fasteners extending from the light bar 102.

Figure 17:
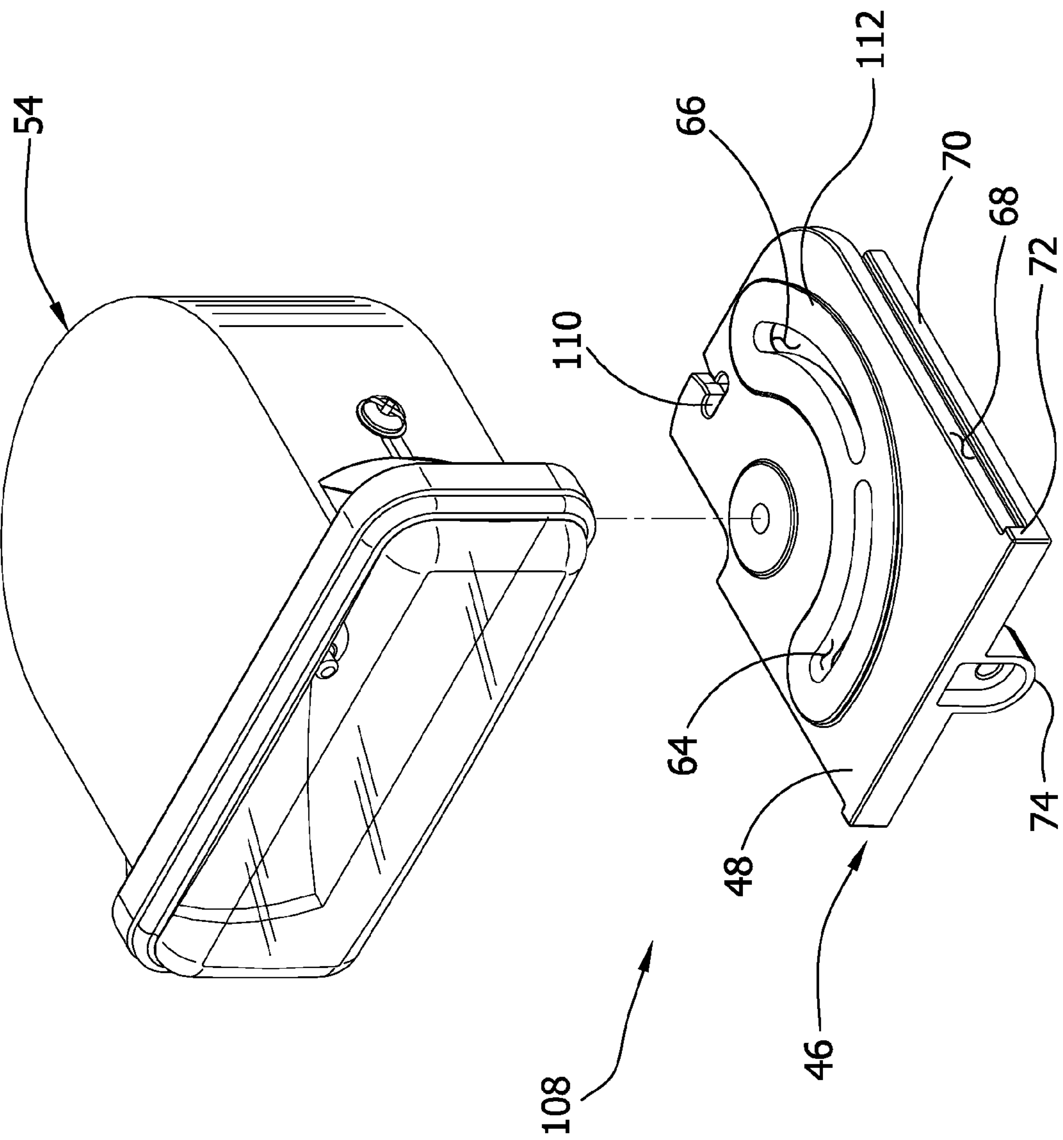
FIG. 17 is a perspective of another embodiment of a light assembly with a light enclosure exploded from a base plate.
Figure 18:
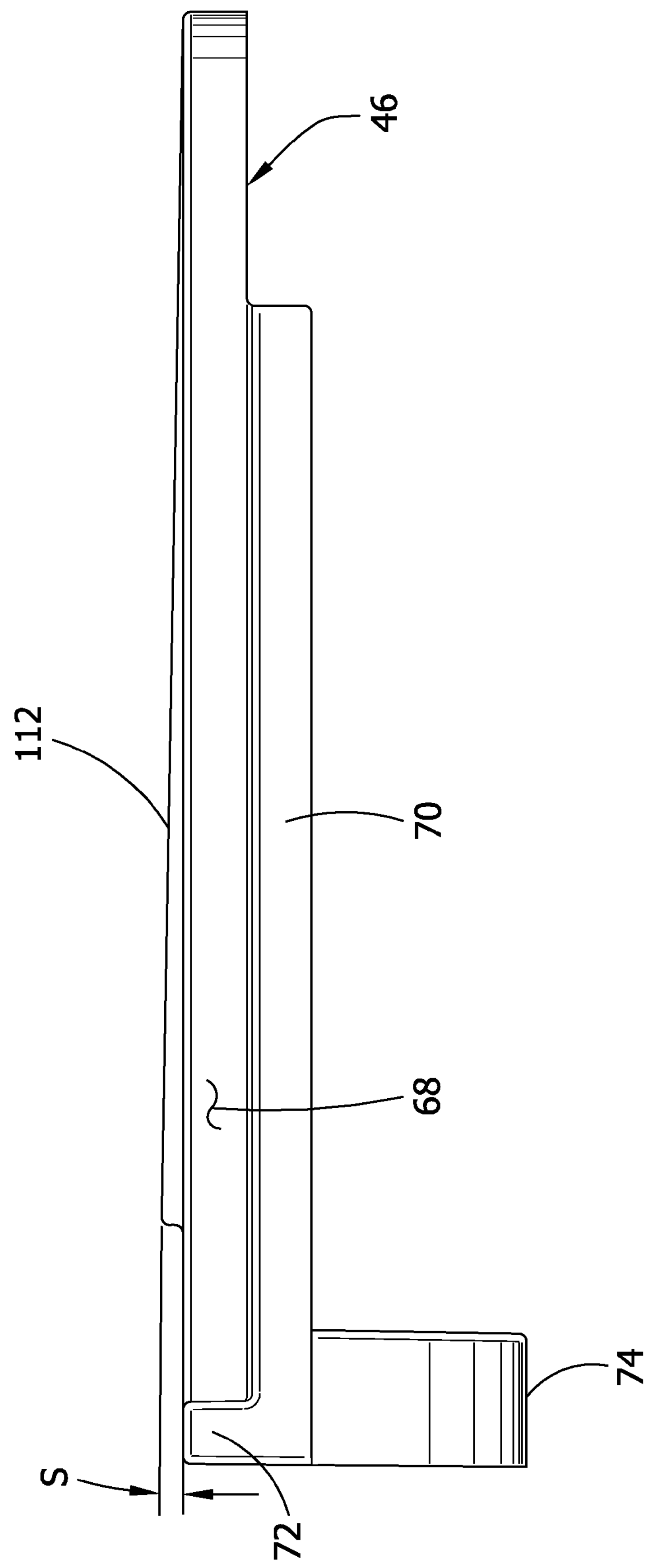
FIG. 18 is a side elevational view of the base plate of FIG. 17.

Referring to FIGS. 17 and 18, another embodiment of the light assembly is generally indicated at 108. The light assembly 108 is similar to the light assembly 16 of the previous embodiment, and therefore, corresponding parts will be indicated by corresponding reference numerals. One difference is that the base plate 46 of the present light assembly 108 includes a T-shaped notch 110 at the inner end 52 of the base plate. The T-shaped notch 110 is adapted to hold the wires $W_1$ in place while the base plate 46 is being slid into the recess 36 so that the base plate will slide over the wires and the wires will be located in the chamber 86.

Referring to FIG. 18, another difference between the present light assembly 108 and the previous light assembly 16 is that a ramp 112 surrounding the first and second slots 64, 66 of the base plate 46 slopes upward toward the outer end 50 of the base plate (i.e., at the first slot 64). The ramp 112 may slope an angle S between about 0.5 degrees and about 1.0 degree. When the light enclosure 54 is pivoted on the base plate 46, it slides up along the area 112. It has been found that when the light enclosure 54 is pivoted toward the outer end 50 of the base plate 46, the light enclosure tends to move downward between 0.5 degrees and 1.0 degrees. Thus, the ramp 112 offsets this downward displacement and maintains the light enclosure 54 substantially at horizontal and parallel to the top surface 20 of the mounting foot 10.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mounting foot for mounting a light bar on a roof of a vehicle, the mounting foot comprising:

a body having an outer end, opposite sides, and a generally planar top surface;

at least one platform adjacent the outer end of the body, the platform having a planar upper surface generally parallel to and below the top surface of the body, a light assembly including a base removably secured to the platform and a light enclosure rotatably connected to the base of the light assembly, the base is slidably removable from a recess.

2. The mounting foot as set forth in claim 1 wherein the light enclosure is rotatable in a rotational plane generally parallel to the upper surface of the platform between a first position and a second position.

3. The mounting foot as set forth in claim 2 wherein the light enclosure is rotatable relative to the platform through a wide angle such that the first and second positions can be offset by an angle of at least about 150 degrees.

4. The mounting foot as set forth in claim 2 wherein the light enclosure has a generally planar top surface that is generally parallel to and either disposed below or generally coplanar with the adjacent top surface of the body.

5. The mounting foot as set forth in claim 1 wherein the platform includes the recess for receiving the base of the light assembly and the base of the light assembly has a planar top surface that is generally coplanar with the top surface of the platform when the base is received in the recess.

6. The mounting foot as set forth in claim 5 wherein a bottom surface of the recess of the platform and a bottom surface of the base of the light assembly at least partially define a chamber for receiving a wire extending from the light assembly.

7. The mounting foot as set forth in claim 6 wherein a wire opening extends through the platform at the bottom surface of the recess for receiving the wire therethrough.

8. The mounting foot as set forth in claim 7 wherein the mounting foot includes a second chamber on the underside of the body for receiving at least a portion of the wire extending through the wire opening.

9. The mounting foot as set forth in claim 8 wherein the second chamber includes a removable plate for allowing access to the wire.

10. A mounting foot for mounting a light bar on a roof of a vehicle, the mounting foot comprising:

a body having an outer longitudinal end, opposite sides, and a top surface, wherein the body is adapted to be mounted on the vehicle so the outer longitudinal end is generally adjacent a lateral edge of the roof, at least one platform adjacent the outer longitudinal end of the body, the at least one platform having an upper surface below the top surface of the body and an outer end generally adjacent to the outer longitudinal end of the body, said platform having a recess in the upper surface of the platform extending through the outer end of the platform, and a light assembly including a base slidably received in the recess of the platform and a light enclosure mounted on the base, the base having a generally planar upper surface substantially flush with the upper surface of the platform and an outer end substantially flush with the outer end of the platform.

11. The mounting foot as set forth in claim 10 further comprising a track for guiding the base of the light assembly as the base is being slidably received in the recess of the platform.

12. The mounting foot as set forth in claim 11 wherein the base of the light assembly includes a tongue extending laterally outward from the base, and wherein the track is sized and shaped to slidably receive the tongue of the light assembly.

13. The mounting foot as set forth in claim 12 wherein the track runs generally parallel to the upper surface of the platform along a wall of the platform defining the recess.

14. A mounting foot as set forth in claim 1 in combination with a light bar mounted on the top surface of the mounting foot, the light bar having a longitudinal end margin disposed over the light enclosure of the light assembly so that the light assembly is between the platform and the light bar.

15. The mounting foot as set forth in claim 1 wherein a friction component is disposed on a lower surface of the platform for providing slip-resistant contact between the mounting foot and the roof of the car.

16. The mounting foot as set forth in claim 15 wherein friction component is adapted to secure to the lower surface of the platform by press fit connection.

17. The mounting foot as set forth in claim 1 wherein the light enclosure is rotatably mounted on the base.

18. The mounting foot as set forth in claim 17 wherein the light assembly includes a shaft extending from the light enclosure through the base of the light assembly, the light enclosure being rotatable relative to the base about an axis of the shaft.

* * * * *